(12) United States Patent
Newhall et al.

(10) Patent No.: US 7,484,856 B1
(45) Date of Patent: Feb. 3, 2009

(54) LENS COVER FOR AN OPTICAL SIGHT

(75) Inventors: Thomas A. Newhall, Tucson, AZ (US); Mark A. Newhall, Tucson, AZ (US)

(73) Assignee: GG&G, Inc., Tucson, AZ (US)

( * ) Notice: Subject to any disclaimer, the term of this patent is extended or adjusted under 35 U.S.C. 154(b) by 0 days.

(21) Appl. No.: 11/668,396

(22) Filed: Jan. 29, 2007

Related U.S. Application Data

(60) Provisional application No. 60/763,479, filed on Jan. 30, 2006.

(51) Int. Cl.
*G02B 11/04* (2006.01)

(52) U.S. Cl. ....................... 359/511; 359/611

(58) Field of Classification Search .............. 359/511, 359/611
See application file for complete search history.

(56) References Cited

U.S. PATENT DOCUMENTS

| | | | |
|---|---|---|---|
| 35,456 A | 6/1862 | Leverich | |
| 1,650,517 A | 11/1927 | Hughes | |
| 2,488,188 A | 11/1949 | Halvorson | |
| 2,514,257 A | 7/1950 | Reavis | |
| 2,522,897 A | 9/1950 | Rotter | |
| 2,599,689 A | 6/1952 | Brelsford | |
| 2,632,252 A | 3/1953 | Blais, Sr. | |
| 2,696,672 A | 12/1954 | Durfee | |
| 2,738,585 A | 3/1956 | Vissing | |
| 2,849,795 A | 9/1958 | Vissing | |
| 2,889,629 A | 6/1959 | Darkenwald | |
| 2,932,334 A | 4/1960 | Steen | |
| 3,015,982 A | 1/1962 | Bing | |
| 3,131,477 A | 5/1964 | Thomas | |
| 3,208,146 A | 9/1965 | Nelson | |
| 3,426,433 A | 2/1969 | Anderson | |
| 3,465,446 A | 9/1969 | Cox | |
| 3,496,642 A | 2/1970 | Pfahler | |
| 3,642,345 A | 2/1972 | Akin, Jr. | |

(Continued)

*Primary Examiner*—Euncha P Cherry
(74) *Attorney, Agent, or Firm*—Lawrence R. Oremland, P.C.

(57) ABSTRACT

A new and useful structure that provides a simple and efficient lens cover for an optical sight, particularly a hooded optical sight. A lens cover structure comprises a lens cover frame, or a pair of lens cover frames, with lens covers designed to cover and uncover the lens openings in an optical sight, particularly a hooded optical sight. Each lens cover is biased toward a covering position in which it covers a respective lens opening in the hood, and is moveable against its bias to an uncovered position in which it uncovers a respective lens opening in the hood. According to a preferred embodiment, the lens covers are configured to be in predetermined orientations relative to the hood, when the lens covers are in their uncovered positions. In addition, a preferred embodiment is designed to enable the lens covers to be conveniently manipulated by the "off hand" (a shooters term describing the hand that is not responsible for fire control). Moreover, a preferred embodiment has a front lens cover configured provide a shade for the front lens opening when the front lens cover is in its uncovered position, and the front lens cover is also configured such that it can be released from its predetermined orientation in the event that a force is applied to the lens cover that might otherwise break or damage the lens cover. In addition, the lens cover structure, according to the present invention, is also designed to enable the lens cover structure to be retrofit to an existing hooded optical sight.

25 Claims, 9 Drawing Sheets

U.S. PATENT DOCUMENTS

| | | |
|---|---|---|
| 3,746,423 A | 7/1973 | Mills |
| 3,831,285 A | 8/1974 | Vissing |
| 3,840,883 A | 10/1974 | Choate |
| 3,942,864 A | 3/1976 | Numbers |
| 4,394,797 A | 7/1983 | Schuster |
| 4,641,932 A | 2/1987 | Harms |
| 4,858,361 A | 8/1989 | White |
| 5,003,697 A | 4/1991 | Hampton |
| 5,150,528 A | 9/1992 | Shire |
| 5,495,676 A | 3/1996 | Chesnut |
| 5,566,490 A | 10/1996 | Owen |
| D445,475 S | 7/2001 | Spear |
| 6,811,268 B2 | 11/2004 | Watson |

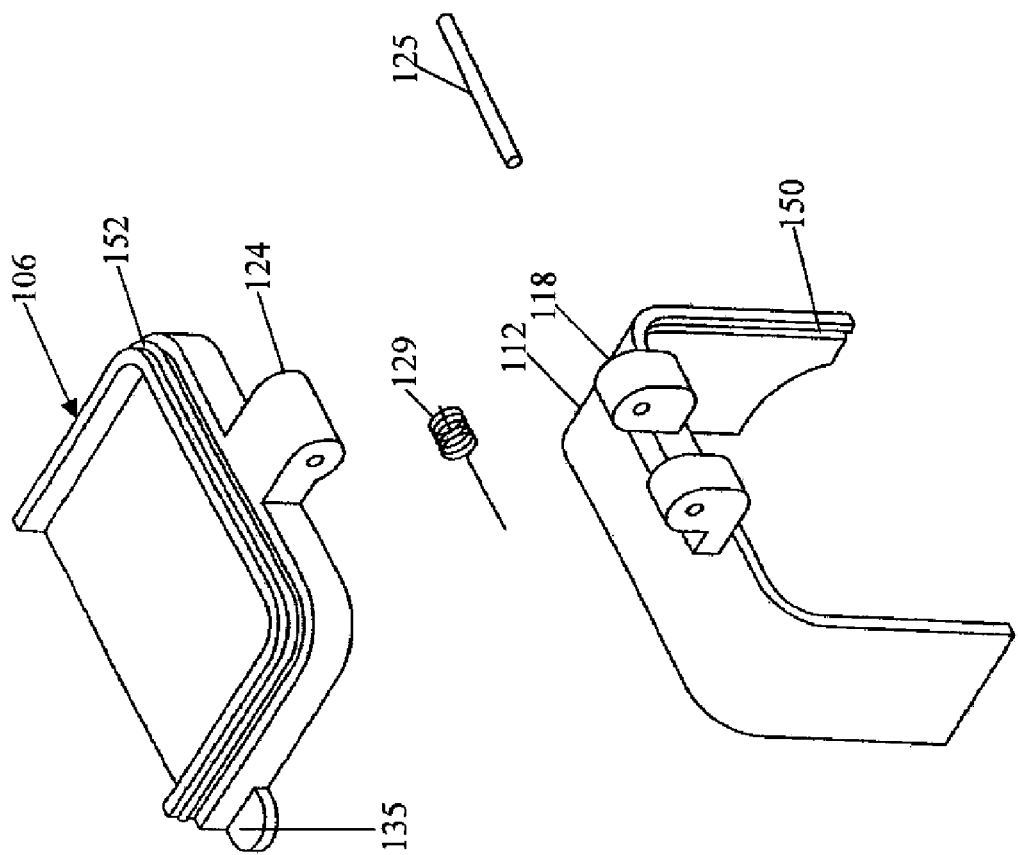
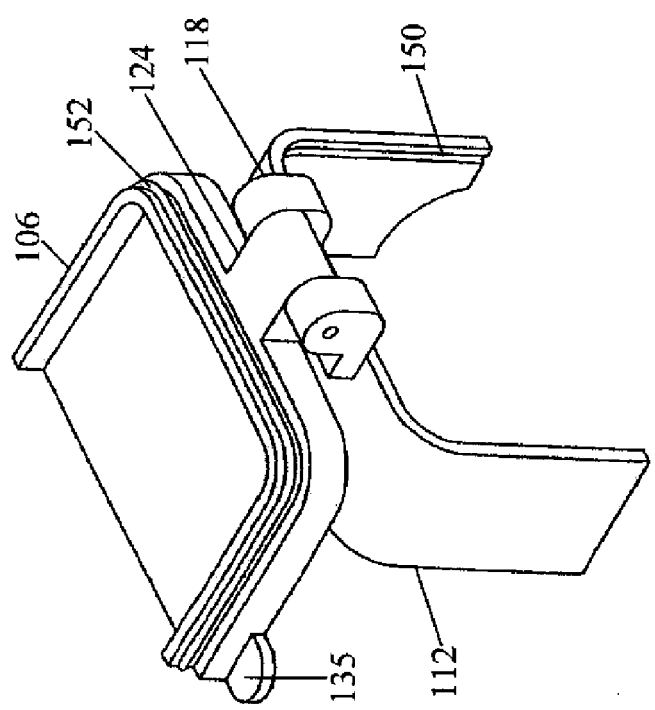
Figure 8
Figure 7

LENS COVER FOR AN OPTICAL SIGHT

RELATED APPLICATION/CLAIM OF PRIORITY

This application is related to and claims priority from provisional application Ser. No. 60/763,479, filed Jan. 30, 2006, which provisional application is incorporated by reference herein.

BACKGROUND

The present invention relates to a protective lens cover for an optical sight, particularly a hooded firearm optical sight, capable of instant adjustment to permit unobstructed use of the optical sight. The present invention protects the lens of the optical sight from weather, dust, and contact with brush, trees, rocks, etc.

A known type of firearm optical sight presently produced by EO TECH is the Holosight (e.g. models 511, 512, 551 and 552). The optical sight has a pair of lens supported by a lens frame, and has a protective hood which covers the frame and has lens openings through which a viewing field is provided for the lens. Moreover, the hood protects the lens frame from damage.

Applicants believe there is a need for a structure that can provide a simple, highly efficient, accurate and secure structure to quickly and easily cover and uncover the lens openings in the hood. Moreover, applicants believe it is also desirable if such structure can be retrofitted to an existing optical sight, such as a hooded optical sight.

SUMMARY OF THE PRESENT INVENTION

The present invention provides a unique, new and useful structure that addresses the foregoing issues. The structure provides a simple and efficient lens cover for an optical sight, such as a hooded optical sight such as an EO Tech Holosight type optical sight.

A lens cover structure according to the present invention comprises a lens cover frame, or a pair of lens cover frames, with lens covers designed to cover and uncover the lens openings in an optical sight, particularly a hooded optical sight. Each lens cover is biased toward an uncovering position in which it covers a respective lens opening in the hood, and is moveable against its bias to an uncovered position in which it uncovers a respective lens opening in the hood.

Also, according to a preferred embodiment, the lens covers are configured to be in predetermined orientations relative to the hood, when the lens covers are in their uncovered positions. In addition, a preferred embodiment is designed to enable the lens covers to be conveniently manipulated by the "off hand" (a shooters term describing the hand that is not responsible for fire control). Moreover, a preferred embodiment has a front lens cover configured to provide a shade for the front lens opening when the front lens cover is in its uncovered position, and the front lens cover is also configured such that it can be released from its predetermined orientation in the event that a force is applied to the lens cover that might otherwise break or damage the lens cover.

In addition, the lens cover structure, according to the present invention, is also designed to enable the lens cover structure to be retrofit to an existing hooded optical sight, such as an EO Tech Holosight.

Additional features of the present invention will become apparent from the following detailed description and the accompanying drawings.

BRIEF DESCRIPTION OF THE DRAWINGS

FIG. 7 is a schematic three dimensional view of a rear lens cover structure that would be combined with the front lens cover structure of FIG. 5, to form the two piece lens cover structure, according to the principles of the present invention;

FIG. 8 is an exploded view of the components forming the rear lens cover of FIG. 7;

DETAILED DESCRIPTION

As discussed above, the present invention provides a lens cover structure that is useful with an optical sight, and particularly a hooded optical sight such as an EO Tech Holosight firearm sight, and is described herein in connection with such a firearm sight. However, from that description, the manner in which the principles of the present invention can be used to form lens cover structure for other types of hooded optical sights will be apparent to those in the art.

Figure 1:
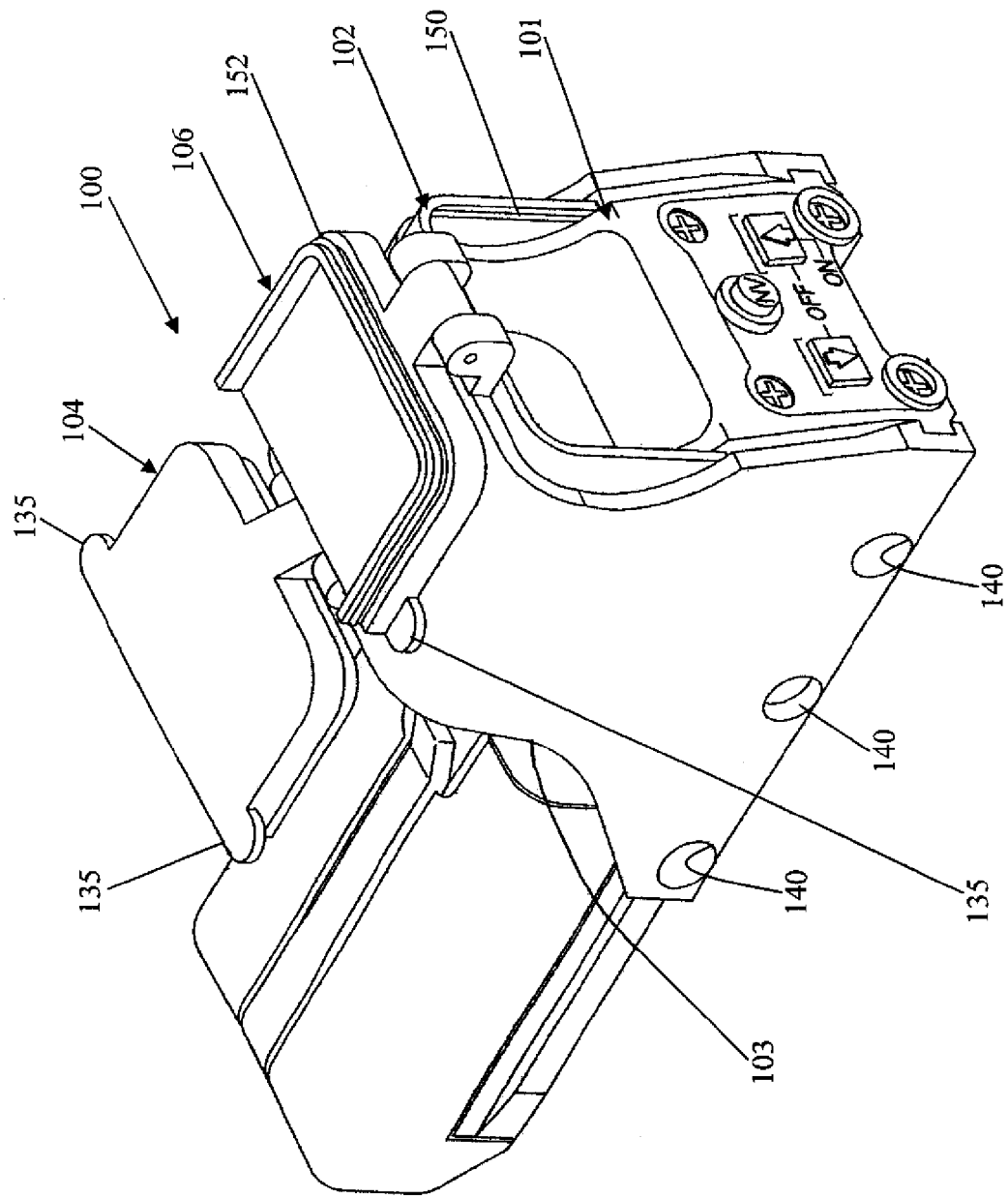
FIG. 1 is a schematic three dimensional illustration of a firearm optical sight with lens cover structure according to the principles of the present invention, with the lens cover structure in an open position, and taken from the rear of the optical sight.
Figure 2:
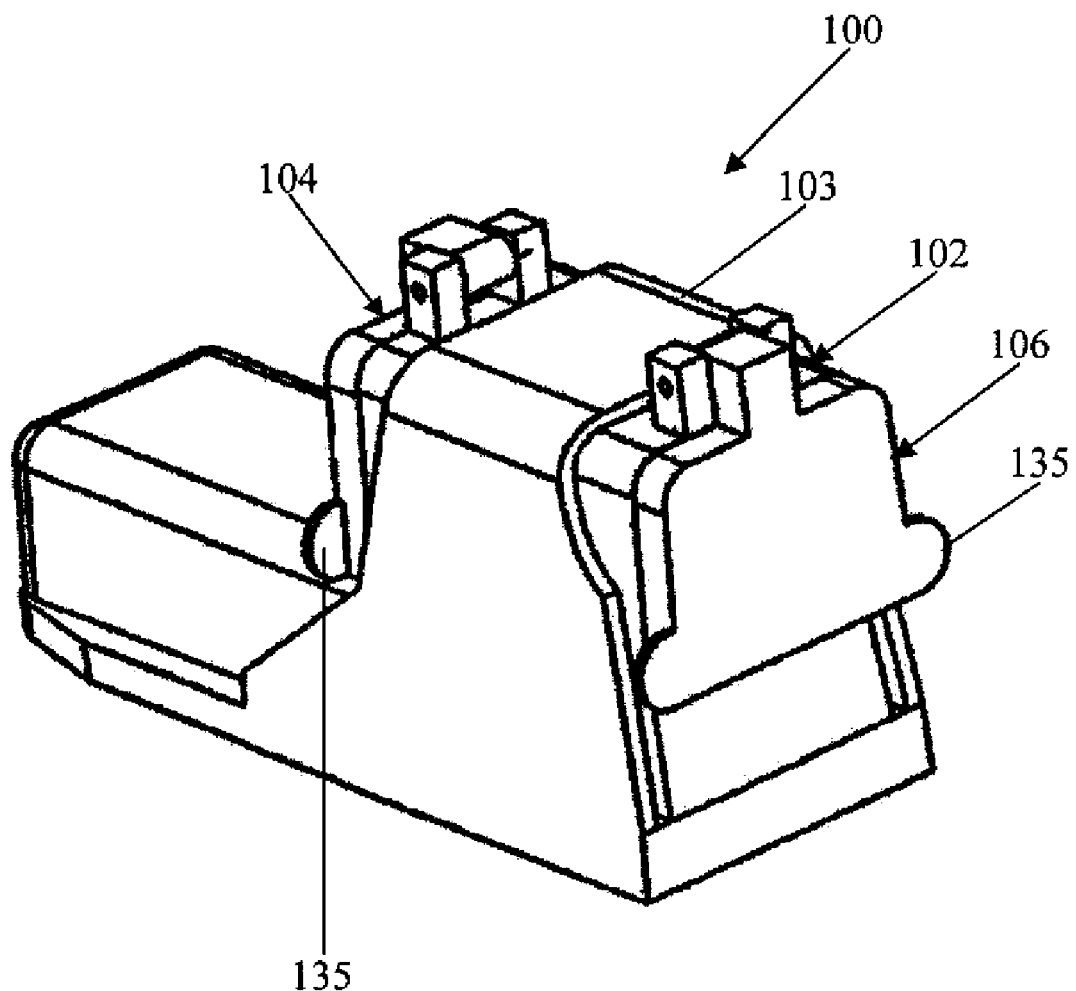
FIG. 2 is a schematic three dimensional illustration of a firearm optical sight with lens cover structure according to the principles of the present invention, with the lens cover structure in a closed position, and taken from the rear of the optical sight.
Figure 3:
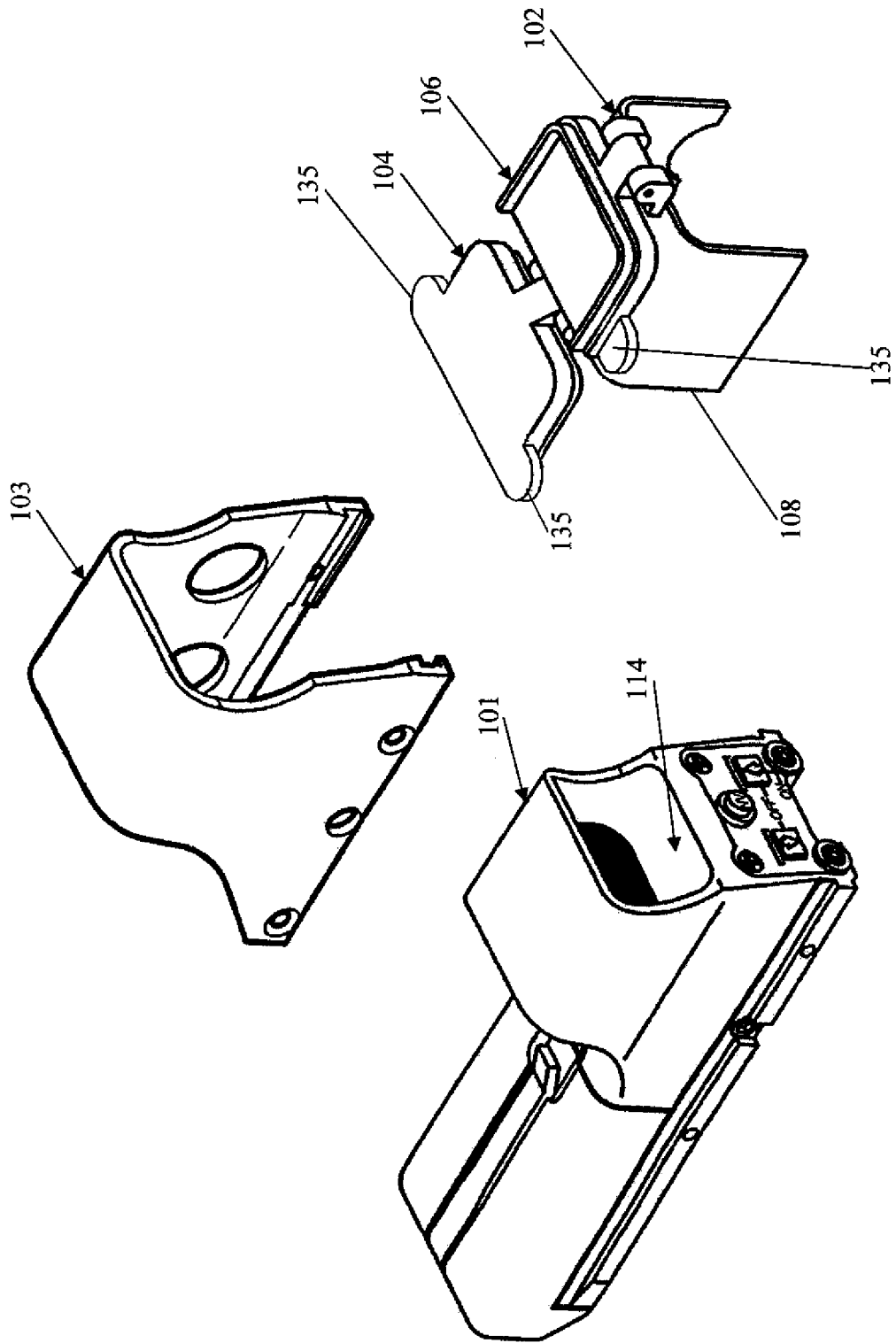
FIG. 3 is a three dimensional, exploded view of a firearm optical sight, a hood, and a lens cover structure according to the principles of the present invention.
Figure 4:
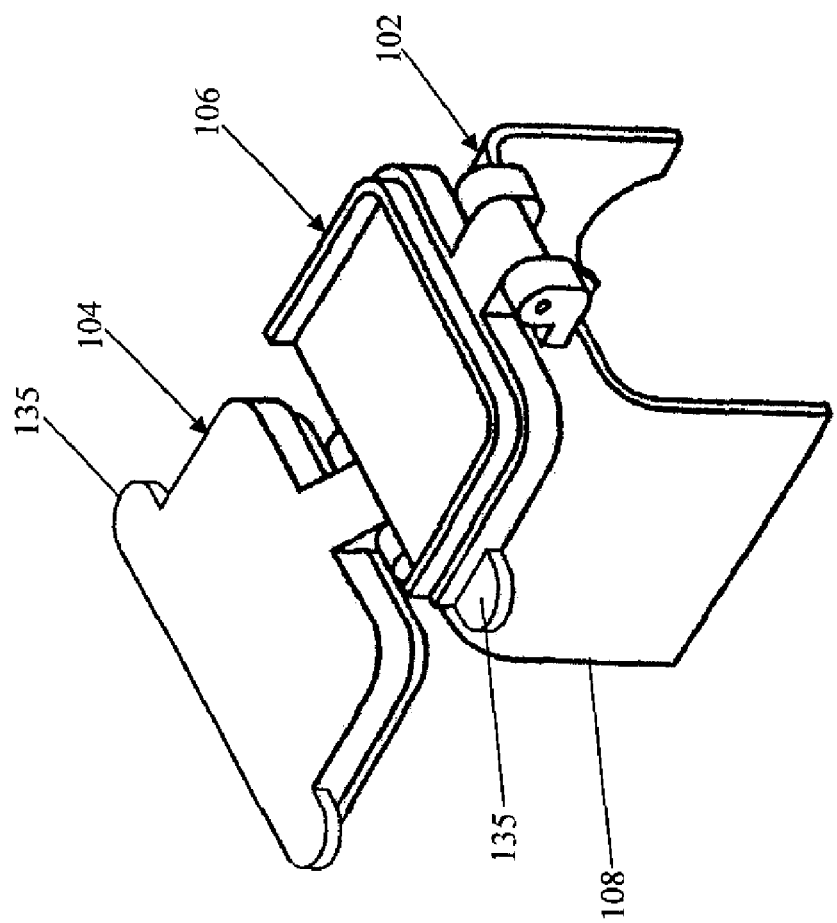
FIG. 4 is a three dimensional view of a one piece lens cover structure, according to the principles of the present invention.

FIG. 1 is a schematic three dimensional illustration of a firearm optical sight 100 with lens cover structure 102 according to the principles of the present invention, with the lens cover structure in an open position, and FIG. 2 shows the lens cover structure in a closed position. The firearm optical sight 100 can be e.g. an EO Tech Holosight type firearm optical sight which can be engaged with and disengaged from a male dovetail of a firearm, in a manner well known to those in the art. The firearm optical sight 100 includes a lens frame 101 that supports a pair of lenses, and a hood 103 that fits over the lens frame 101, and protects the lens frame, as is well known to those in the art. The lens cover structure 102, constructed according to the principles of the present invention, includes a front lens cover 104 and a rear lens cover 106. The front and rear lens covers can be secured to a single lens cover frame member 108 (e.g. FIG. 4), or each lens cover can be secured to a separate lens cover frame member, i.e. the front lens cover 104 can be secured to a front lens cover frame member 110 and the rear lens cover 106 can be secured to a rear lens cover frame member 112 (see e.g. FIGS. 5-8). Regardless of whether the lens covers are secured to a single lens cover frame member or to separate lens cover frame members, the lens cover frame member(s) is (are) configured to fit inside the hood 103 of the firearm optical sight. The hood 103 has a pair of lens openings 114 (one of the lens openings is shown in FIGS. 3 and 9-11) through which the lens supported on the lens frame 101 establish of field of view for the sight. The lens cover structure 102 is configured to selectively provide coverings for the lens openings 114 in the hood 103, in the manner described in more detail herein.

The rear lens cover 106 has a pivot member 124 that can pivot about an axle 125 which is connected to a boss 118 formed in one piece with the lens cover frame member 112 (see e.g. FIGS. 7, 8). The front lens cover 104 has a pivot member 126 that can pivot about an axle 127 which is supported by a boss 120 formed in one piece with the lens cover frame member 110 (see e.g. FIGS. 5, 6). Each of the front and rear lens covers are biased to an uncovered position in which it uncovers its respective lens opening in the hood 103. Thus, in FIGS. 5, 6, a biasing spring 122 extends about axle 127 and acts on the pivot member 126 and biases the front lens cover 104 to an uncovered position. Similarly, as seen in FIGS. 7, 8, a biasing spring 129 extends about axle 125 and acts on the pivot member 124 and biases the rear lens cover 106 to an uncovered position.

As shown in FIG. 1, when the lens covers 104, 106 are in the uncovered positions; the rear lens cover 106 is biased to an orientation in which it rests on top of the hood 103. The front lens cover 104 is biased to an orientation in which it extends forward from the hood, and forms a shade for the lens opening in the hood. Interaction between the pivot member 126 and the front side of the lens cover frame member, (see e.g. FIGS. 5, 6 and 12), provides a stop that resists further pivotal movement of the front lens cover, and orients the front lens cover in a generally forward (horizontal) orientation in which it forms a shade for the lens opening of the hood 103.

The front and rear lens covers can be manually pivoted, against their spring bias, to move the lens covers to covered positions in which they cover the lens openings in the hood (see e.g. FIG. 2). The lens covers are preferably molded of synthetic plastic, and their pivot members are molded in one piece with the respective lens covers. The biasing springs bias the lens covers in specific directions toward their uncovered positions, and the lens covers can be manually manipulated to pivot the lens covers against their spring bias and into respective positions in which they cover respective lens openings in the hood 103. The lens covers have finger tabs 135 that enable the lens covers to be conveniently manipulated with a finger. Moreover, it will be clear to those in the art that the foregoing structure enables the lens covers to be manipulated by the "off hand" (a shooters term describing the hand that is not responsible for fire control).

The lens covers and the lens cover frame(s) are preferably formed of a rugged material. For example, it is currently preferred to form (preferably mold) each of the lens covers and the lens cover frame(s) from synthetic material such as Delrin® (a resin produced by DuPont) or from hard rubber.

Figure 12:
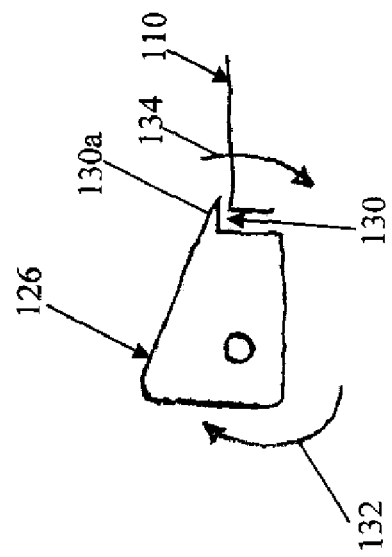
FIG. 12 is a schematic illustration of the mechanism that retains the front lens cover in an uncovered position, according to the principles of the present invention.
Figure 6:
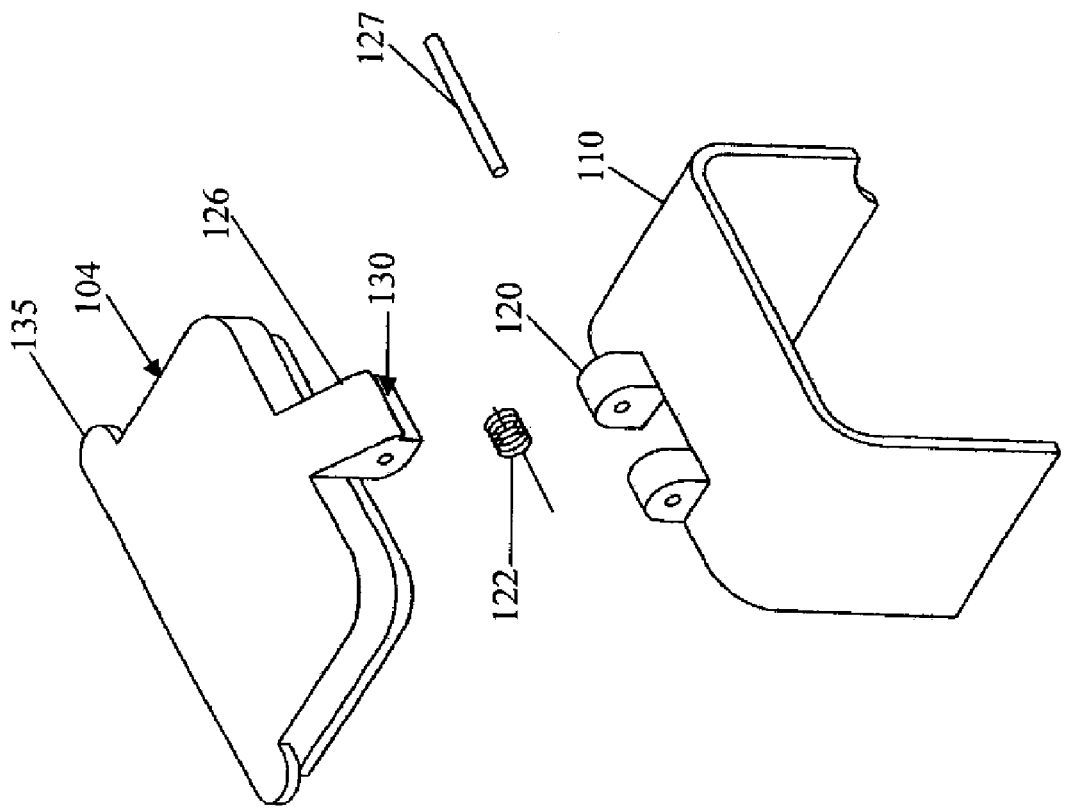
FIG. 6 is an exploded view of the components forming the front lens cover of FIG. 5.
Figure 5:
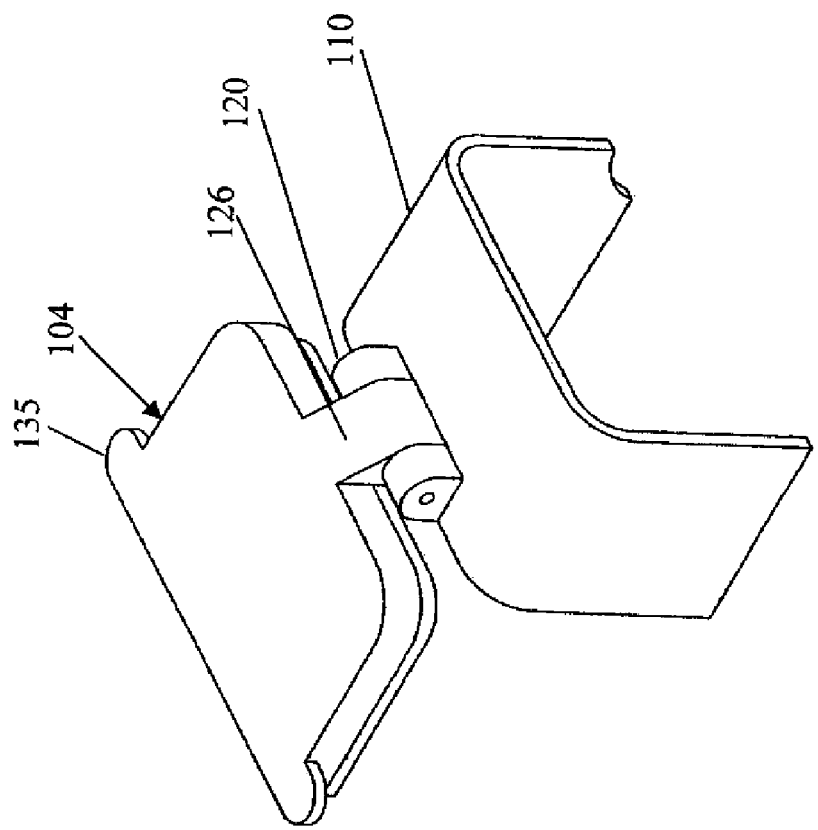
FIG. 5 is a schematic three dimensional view of a front lens cover structure that is part of a two piece lens cover structure, according to the principles of the present invention, and illustrating another version of the lens cover structure.
Figure 9:
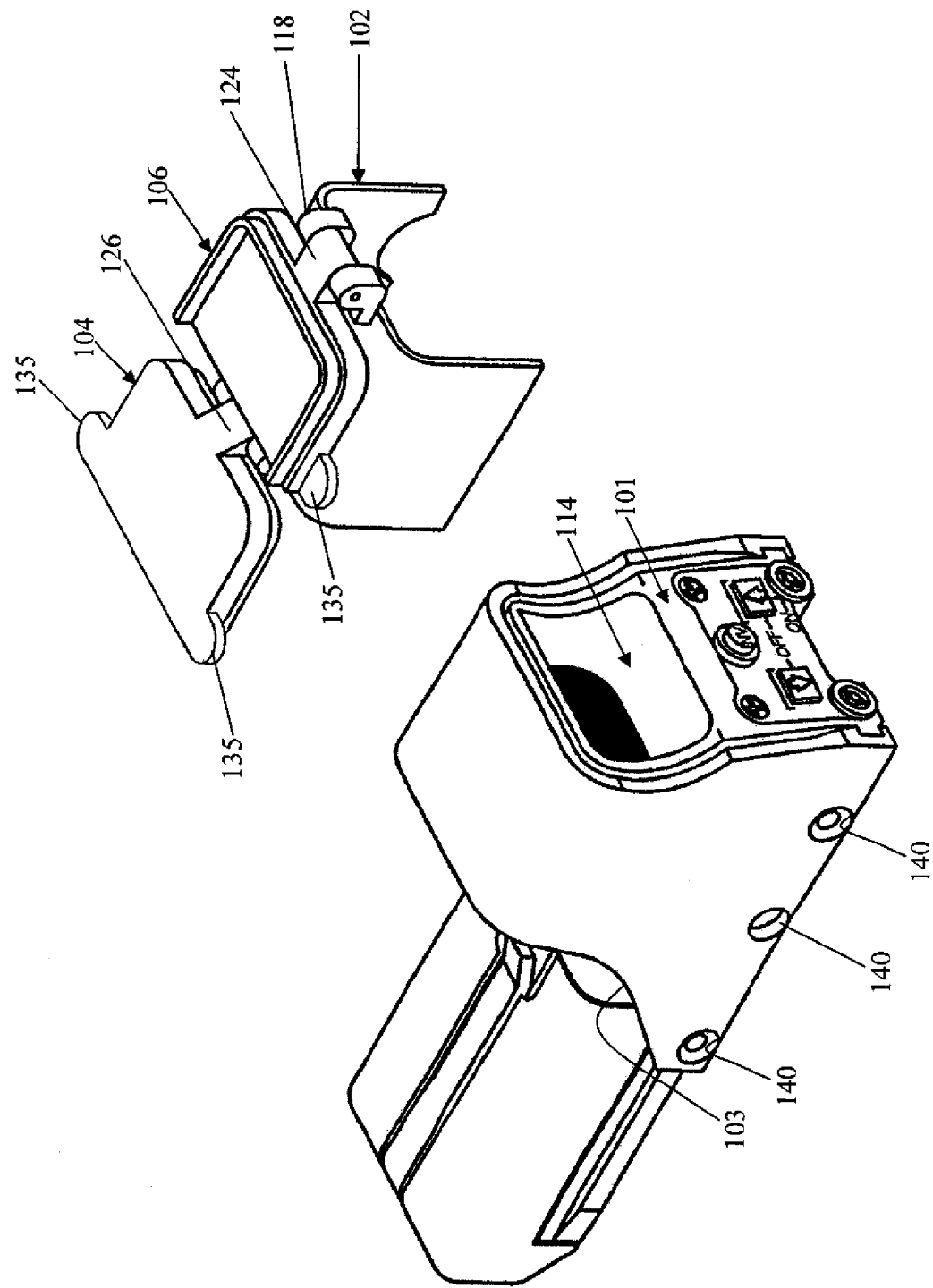
FIG. 9 is an exploded view of a firearm optical sight and a lens cover structure according to the version shown in FIG. 4, before assembly.

According to the present invention, the front lens cover 104 is biased to the orientation of FIG. 1, in which it extends forward from the lens opening in the hood 103, and forms a shade for the lens opening in the hood. The front lens cover 104 is generally maintained in that orientation, by the interaction between the pivot member 126 and the lens frame member 110 that is shown in FIGS. 5, 6 and 12. However, there are some circumstances where the front lens cover 104 may be subjected to forces, e.g. upward forces due to engagement with tree branches, shrubs, etc. when the front lens cover 104 is in the orientation of FIG. 1, and it may be desirable that the front lens cover 104 be able to pivot further toward the top of the hood 103, in response to such forces. For example, if a tree branch, or a shrub, were to catch the front lens cover 104 and exert an upward force on the front lens cover 104, if the front lens cover can conveniently release from the forward (horizontal) orientation of FIG. 1, and pivot further toward the top of the hood 103, the risk of damage to the front lens cover from such forces is reduced. According to the principles of the present invention, the interaction between the pivot member 126 of the front lens cover 104 and the hood is configured such that the front lens cover 104 is normally maintained in the forward orientation of FIG. 1 when the front lens cover is in the uncovered position. Specifically, the pivot member 126 of the front lens cover has a stepped ledge 130 (FIGS. 6, 12) that engages the front of the lens cover frame member 110, and maintains the front lens cover 104 in the forward (horizontal) orientation relative to the hood, under normal conditions. In the event the front lens cover 104 is subjected to an upward force, that tends to produce a moment in the direction of arrow 132, the end 130*a* of the stepped ledge can be resiliently deformed slightly, to enable the end 130*a* to snap past the edge of lens cover frame member 110, in the direction shown by arrow 134, and to allow the front lens cover 104 to pivot further toward the top of the hood 103. Thus, the interaction between the pivot member 126 and the lens cover frame member is such that in response to an upward force of a predetermined magnitude and direction, the front lens cover 104 is effectively released from the orientation of FIG. 1, and can pivot farther toward the top of the hood 103, thereby accommodating the upward force in a manner that minimizes the risk of the front lens cover being damaged or broken by that upward force.

The lens cover structure 102 and the hood 103 can be assembled and disassembled in various ways. For example, the hood 103 has an inverted U shaped profile and each lens cover frame member (e.g. the single lens cover frame member 108 or each of the lens cover frame members 110, 112) has a generally inverted U shaped profile, that is configured to fit closely within the hood. The hood 103 is normally connected with the lens frame 101 by means of screws that extend through aligned openings 140 in the hood 103 and the lens frame 101 of the optical sight. When both the front and rear lens covers are connected with a single lens cover frame member 108, the hood 103 is normally detached from the lens frame 101, and the lens cover frame structure 102 is then fit within the inverted U shaped hood to form a hood/lens cover structure subassembly. The sides of the hood 103 have a slight outward bias, so that when the hood 103 is released from the lens frame 101, the legs spring outward slightly, which allows the lens cover structure 102 to conveniently fit inside the hood 103 to form the hood lens cover structure subassembly. The hood/lens cover structure subassembly is then connected with the lens frame 101 by the screws that connect the hood to the lens frame 101. On the other hand, when the front and rear lens covers are connected to separate lens cover frames 110, 112, those separate frames can be fitted through and into the lens openings of the hood from the front and rear of the hood, while the hood 103 is attached to the lens frame 101 (see e.g. FIG. 10). In that case, the lens cover frames 110, 112, can be dimensioned for a close frictional fit between the hood 103 and the lens frame 101, or the lens cover frame(s) and the hood can be provided with mating snap in connections that retain the frames in the hood. In this application, a lens cover structure being "retained" within the hood of a firearm sight means that the lens cover structure is engaged with or coupled with the hood in a manner that resists the lens cover structure from being uncoupled (or dislodged) from the hood by gravity (e.g. if the hooded optical sight were tilted to a vertical orientation while the firearm is being carried), or by the forces encountered when the firearm is discharged, but does not exclude the lens cover structure being manually pulled from or otherwise manually uncoupled from the hood.

With either way of connecting the lens cover structure 102 with the hood, it will be clear to those in the art that the lens cover structure 102 can easily and conveniently be retrofit to an existing hooded optical sight. Also, it should be noted that when a lens cover structure is connected with the hood, the ends of the lens cover frame(s) will extend slightly out of the lens openings in the hood.

Thus, according to the present invention, lens cover structure is designed to be combined with the hood of an optical sight. The lens cover structure comprises a lens cover frame and a lens cover pivotally connected with the lens cover frame, with the lens cover frame configured to be located at least partially in an opening in a hood of an optical sight. The lens cover is configured to be pivoted between a covering position in which covers a lens opening of the hood and an uncovered position in which it uncovers the lens opening. The lens cover is biased toward the uncovered position, and is configured to be retained in a predetermined orientation relative to the hood when in the uncovered position.

The lens cover structure, particularly the front lens cover structure, is configured to form a shield for a lens opening in the hood, when the lens cover is in the uncovered position (FIG. 1). Such a front lens cover would extend in a generally forward orientation relative to the lens opening in the hood, when the lens cover is in the uncovered position. The front lens cover is retained in the predetermined orientation by interaction between the pivot member 126 of the front lens cover and a portion of the lens cover frame member when the front lens cover is in the uncovered position. The pivot member 126 of the front lens cover is configured (e.g. with the stepped configuration of FIGS. 5, 6, and 12) so that the front lens cover interacts with a portion of the lens cover frame structure, to provide resistance to further movement of the front lens cover relative to the lens cover frame and the hood when the front lens cover is in the predetermined orientation, thereby to enable the front lens cover to be retained in the predetermined orientation when the front lens cover is in the uncovered position. However, that configuration of the front lens cover also enables the front lens cover to pivot beyond the predetermined orientation when the front lens cover is subjected to a force that overcomes the resistance to movement of the front lens cover relative to the hood when the lens cover is in the uncovered position.

Figure 10:
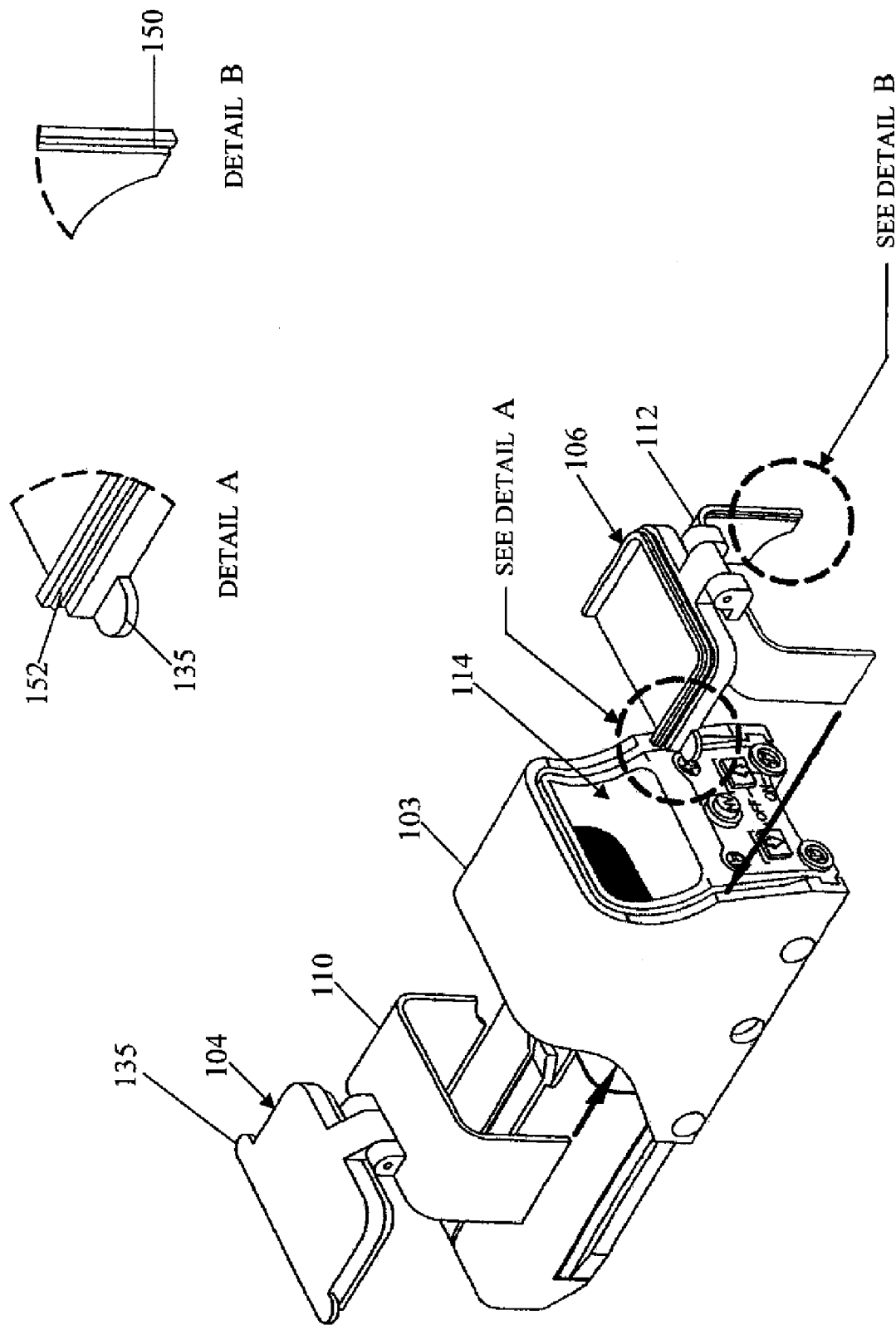
FIG. 10 is an exploded view of a firearm optical sight and lens cover structures according to the versions of FIGS. 5-8, with detail portions of the lens cover structure (Details A and B) shown on enlarged scales.
Figure 11:
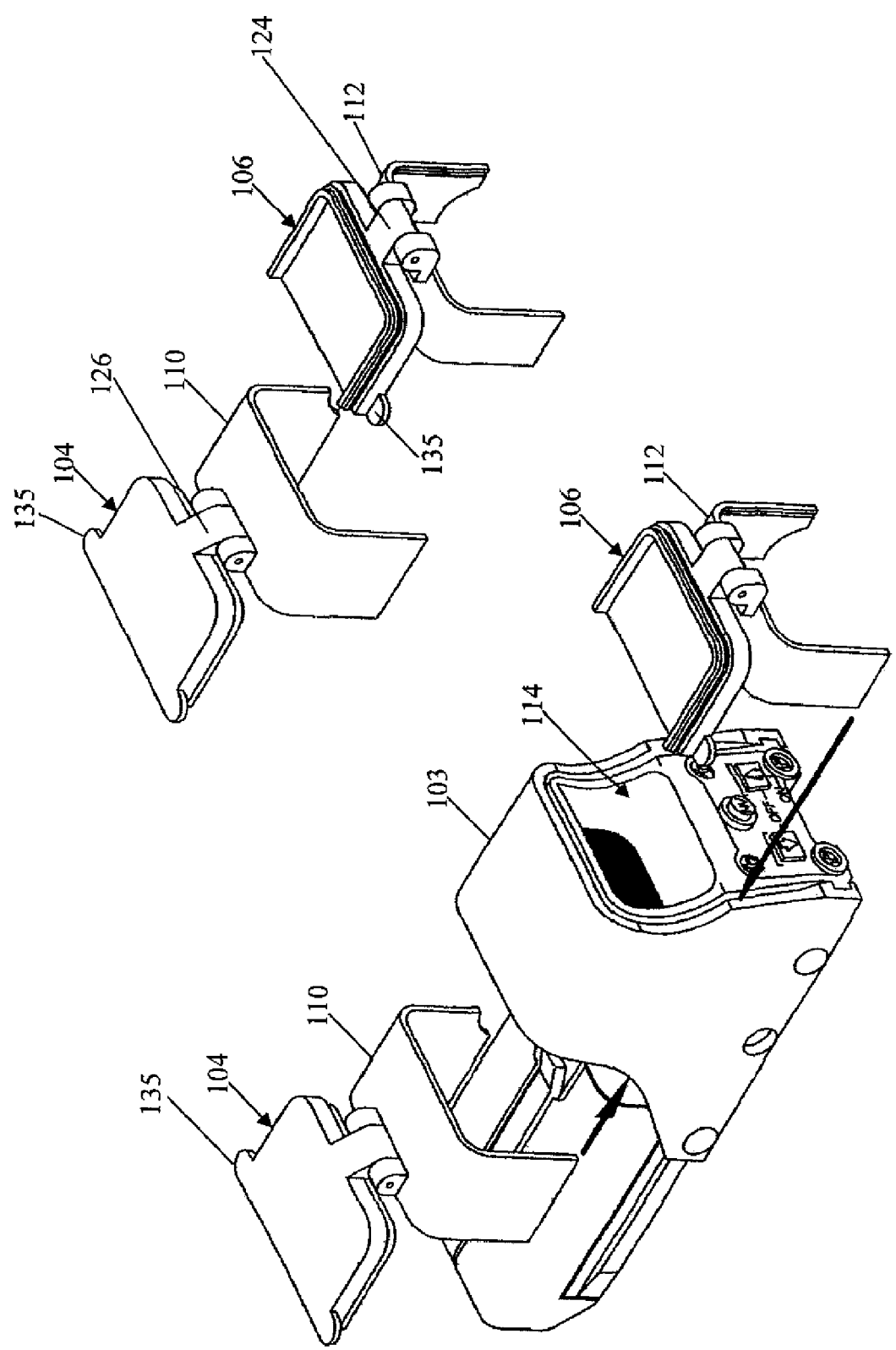
FIG. 11 is an exploded view of a firearm optical sight and lens cover structures according to the versions of FIGS. 5-8, and schematically illustrating how the lens cover structures can be assembled with the firearm optical sight.

Both the front and rear lens covers and the lens cover frame(s) have respective latch portions 150, 152 that cooperate to retain the lens covers in their covering positions (see e.g. FIG. 10, including Detail B). The latch portions may comprise e.g. a recess 150 in the lens cover frame, and a mating protrusion 152 on the lens cover. The rear lens cover 106 is normally configured to rest on top of the hood when the lens cover is in the uncovered position (FIG. 1). The front lens cover 104 is normally biased to a forward (horizontal) orientation in which it forms a shade for the lens opening, when the front lens cover is in its uncovered position, and can be pivoted further toward the top of the hood, in response to an upward force that overcomes the resistance to movement of the front lens cover.

The lens cover frame, or frames, each have an inverted U shaped configuration with outer wall portions configured to fit closely inside the inverted U shaped hood and to interact with the hood to retain the frame(s) engaged with the hood. Also, the lens cover structure 102 is designed to be conveniently retrofit to existing sights with hooded lens covers.

Accordingly, as seen from the foregoing detailed description, the present invention provides a lens cover structure that can be conveniently assembled with an optical sight (especially a hooded optical sight), and enables the lens covers to be simply and efficiently manipulated to positions in which they cover and uncover the lens openings of a hooded optical sight.

With the foregoing disclosure in mind, the manner in which the principles of the present invention can be used to design various types of lens covers, for various types of sight devices, will be apparent to those in the art.

The invention claimed is:

1. An optical sight assembly comprising an optical sight with a lens frame that supports at least one lens, an inverted U shaped protective hood disposed over at least a portion of the lens frame and having a lens opening, and lens cover structure comprising a lens cover frame and a lens cover pivotally connected with the lens cover frame, the lens cover frame located at least partially in the lens opening in the protective hood and between the protective hood and the lens frame, the lens cover configured to be pivoted between a covering position in which covers the lens opening of the protective hood and an uncovered position in which it uncovers the lens opening of the protective hood.

2. An optical sight assembly as defined in claim 1, wherein the lens cover frame is configured to be inserted at least partially into the lens opening in the protective hood and the lens cover frame is configured to engage the protective hood in a manner that retains the lens cover frame engaged with the protective hood.

3. An optical sight assembly as defined in claim 1, wherein the lens cover is biased toward the uncovered position, and is configured to be retained in a predetermined orientation relative to the protective hood when in the uncovered position.

4. An optical sight assembly as defined in claim 3, wherein the lens cover is configured to form a shade for the lens opening in the protective hood, when the lens cover is in the uncovered position.

5. An optical sight assembly as defined in claim 4, wherein the lens cover extends in a generally forward orientation relative to the lens opening in the protective hood, when the lens cover is in the uncovered position.

6. An optical sight assembly as defined in claim 5, wherein the lens cover is retained in the predetermined orientation by interaction between a portion of the lens cover and a portion of the protective hood when the lens cover is in the uncovered position.

7. An optical sight assembly as defined in claim 6, wherein the portion of the lens cover is configured to interact with a portion of the lens cover frame structure, to provide resistance to further movement of the lens cover relative to the lens cover frame structure and the protective hood when the lens cover is in the predetermined orientation, thereby to enable the lens cover to be retained in the predetermined orientation when the lens cover is in the uncovered position.

8. An optical sight assembly as defined in claim 7, wherein the portion of the lens cover that interacts with the lens cover frame structure is also configured to enable the lens cover to pivot beyond the predetermined orientation when the lens cover is subjected to a force that overcomes the resistance to movement of the lens cover relative to the lens cover frame structure when the lens cover is in the uncovered position.

9. An optical sight assembly as defined in claim 8, wherein the structure that pivotally connects the lens cover with the frame is configured to engage a part of the lens cover frame to retain the lens cover in the position in which it forms a shade for the lens opening in the protective hood.

10. An optical sight assembly as defined in claim 4, wherein the structure that pivotally connects the lens cover with the lens cover frame is configured to engage a part of the lens cover frame to retain the lens cover in the position in which it forms a shade for the lens opening in the protective hood.

11. An optical sight assembly as defined in claim 3, wherein the lens cover and the lens cover frame have respective latch portions that co-operate to retain the lens cover in the covering position.

12. An optical sight assembly as defined in claim 3, wherein the lens cover is configured to rest on top of the hood when the lens cover is in the uncovered position.

13. An optical sight assembly as defined in claim 2, wherein the lens cover frame has an inverted U shaped configuration with outer wall portions configured to fit closely in the inverted U shaped protective hood and to interact with the inverted U shaped protective hood to retain the lens cover frame engaged with the inverted U shaped protective hood.

14. A lens cover structure for attachment to an optical sight assembly that comprises an optical sight with a lens frame that supports at least one lens, an inverted U shaped protective hood disposed over at least a portion of the lens frame, and the U shaped protective hood including a lens opening; the lens cover structure comprising a lens cover frame and a lens cover pivotally connected with the lens cover frame, the lens cover frame configured to be located at least partially in the lens opening in the U shaped protective hood and configured to engage the protective hood in a manner that retains the lens cover frame engaged with the protective hood, the lens cover configured to be pivoted between a covering position in which covers the lens opening of the protective hood and an uncovered position in which it uncovers the lens opening of the protective hood.

15. Lens cover structure as defined in claim 14, wherein the lens cover is biased toward the uncovered position, and is configured to be retained in a predetermined orientation relative to the protective hood when in the uncovered position.

16. Lens cover structure as defined in claim 15, wherein the lens cover is configured to form a shade for a lens opening in a protective hood, when the lens cover is in the uncovered position.

17. Lens cover structure as defined in claim 16, wherein the lens cover is configured to be retained in an orientation in which it extends in a generally forward orientation relative to a lens opening in a protective hood, when the lens cover is in the uncovered position.

18. Lens cover structure as defined in claim 17, wherein the lens cover is configured to be retained in the predetermined orientation by interaction between a portion of the lens cover and a portion of the lens cover frame when the lens cover is in the uncovered position.

19. Lens cover structure as defined in claim 18, wherein the portion of the lens cover is configured to interact with a portion of the lens cover frame, to provide resistance to further movement of the lens cover relative to the lens cover frame and a protective hood when the lens cover is in the predetermined orientation, thereby to enable the lens cover to be retained in the predetermined orientation when the lens cover is in the uncovered position.

20. Lens cover structure as defined in claim 19, wherein the portion of the lens cover that interacts with the lens cover frame is also configured to enable the lens cover to pivot beyond the predetermined orientation when the lens cover is subjected to a force that overcomes the resistance to movement of the lens cover relative to the lens cover frame when the lens cover is in the uncovered position.

21. Lens cover structure as defined in claim 20, wherein the structure that pivotally connects the lens cover with the lens cover frame is configured to engage a part of the lens cover frame to retain the lens cover in the position in which it forms a shade for a lens opening in a protective hood.

22. Lens cover structure as defined in claim 16, wherein the structure that pivotally connects the lens cover with the lens cover frame is configured to engage a part of the lens cover frame to retain the lens cover in the position in which it forms a shade for an opening in a protective hood.

23. Lens cover structure as defined in claim 15, wherein the lens cover and the lens cover frame have respective latch portions that co-operate to retain the lens cover in the covering position.

24. Lens cover structure as defined in claim 15, wherein the lens cover is configured to rest on top of the hood when the lens cover is in the uncovered position.

25. Lens cover structure as defined in claim 14, wherein the lens cover frame has an inverted U shaped configuration with outer wall portions configured to fit closely in an inverted U shaped protective hood and to interact with the inverted U shaped protective hood to retain the lens cover frame engaged with the inverted U shaped protective hood.

* * * * *